Patented Mar. 31, 1936

2,035,939

UNITED STATES PATENT OFFICE 2,035,939

PROCESS FOR THE PREPARATION OF ARTIFICIAL FIBERS

Maurice Belloc, Paris, France, assignor to Societe Nobel, Francaise, (Societe Anonyme), Paris, France, a corporation of France No Drawing. Application April 20, 1933, Serial No. 667,054. In France April 23, 1932

17 Claims. (Cl. 18—54)

The present invention relates to the manufacture of an artificial textile fiber spun from a condensation product of polyvinyl alcohol and an aldehyde. It is well known that certain vinylic esters are capable of forming, by polymerization and condensation with aldehydes, plastic masses of high molecular weight, having remarkable technical qualities. In particular, it is well known more or less polymerized vinyl acetate produces by saponification polyvinylic alcohol which condenses with considerable facility with aldehydes for producing products of a fibrous texture and great solidity. It has been found that these condensation products are capable of being used for the wet or dry spinning of artificial textile fibers having remarkable qualities.

I have found that such products may be prepared by starting with the polymerized vinylic ester, and consequently, without isolating the polyvinylic alcohol and without previously placing the ester in solution in an organic compound. A desirable process for obtaining such products is set forth in my copending application Serial No. 661,636 filed March 18, 1933, now Patent No. 1,990,399. These products have the chemical composition of acetals, that is to say their probable general typical formula is:

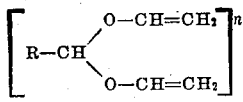

where R represents a simple aliphatic radical such as H or CH$_3$, that is to say that these products can be prepared with formaldehyde (or its polymers such as trioxymethylene) or acetaldehyde (or its polymers such as paraldehyde).

The preparation of these condensation products is effected advantageously as follows: vinyl acetate (or any other aliphatic ester, such as, chloracetate, or vinyl propionate or butyrate) is polymerized in the known manner and under the action of suitable catalysts, such as, organic peroxides, oxygenated water or persalts. The gummy polymerization product obtained (polyvinyl acetate) is purified for eliminating the polymeric bases, whereby a hard transparent and colorless gum is obtained.

The gum thus prepared is converted directly into a condensation product. For this purpose, I have found that the following process is particularly suitable. Polyvinyl acetate is saponified by concentrated hydrochloric acid, water and a small amount of alcohol; the whole is thoroughly mixed in the cold as a result of which there is obtained a thick and homogeneous liquid containing polyvinyl alcohol. To this thick liquid is added, also in the cold, an aliphatic aldehyde. I have successfully employed such aliphatic aldehydes as formaldehyde and its polymers (trioxymethylene) and acetaldehyde and its polymers (paracetaldehyde). Other aldehydes are also suitable for this reaction. The particular aldehydes mentioned are aliphatic aldehydes containing less than three carbon atoms, or their polymers. The condensation is fairly rapid. After being allowed to stand for about ten hours there is obtained a thick acid syrup containing the desired condensation product which serves as the primary spinning material for the production of artificial textile fibers, which can be produced therefrom as hereinafter described.

It is well known that the manufacture of artificial textile materials may be effected by two distinct general processes: coagulation of a solution spun through a narrow orifice into a liquid or into a gaseous medium. The first process is used for the manufacture of viscose silk, the coagulating liquid being constituted by a solution of sulphuric acid containing suitable salts. The second process is used for the manufacture of silks having a cellulose acetyl base, the gaseous medium being more or less rarefied air which is suitably heated.

The two processes have been found to be suitable for the manufacture of artificial threads from products prepared in the manner above described.

The thick hydrochloric liquid containing the condensation product of polyvinyl alcohol and aldehyde may be spun without difficulty in a bath of coagulating liquid. In this case the liquid is simply composed of water. This water may, with advantage, have added thereto various chemical agents, such as, dilute caustic alkalies or carbonates which facilitate the elimination of the hydrochloric acid, a slight increase in temperature also promotes spinning. It has been found that the spinning process used in the viscose silk industry under the name "continuous process" is more advantageous in the case in question than the "spinning pot" process. It is nevertheless necessary to specify that this process is within the scope of the invention with the reservation of slight modifications justified by reason of the corrosive action of hydrochloric acid. On leaving the coagulating bath the thread is washed in a thorough and systematic manner.

The dry spinning process is also applicable. In this case it is necessary to isolate the condensation product in a pure state. For this purpose the thick liquid, above described, has added thereto water, when there is produced a precipitation of the condensation product in the form of white fibers. The product is thoroughly washed until neutral, dried, then dissolved in suitable solvents so as to form collodions.

The solvents which may be used are numerous and different according to the primary materials which are used and the products which it is desired to obtain. In general, methyl acetate, ethyl alcohol, chloruretted solvents, such as, chloroform, ethylene trichloride, tetrachlorethane, ethylene dichloride and methylene chloride, used alone or mixed together are absolutely suitable for the purpose in view. The collodion, suitably purified by filtration or centrifuging, is then spun in the ordinary manner and at a temperature which is varied according to the solvents used.

In the two spinning processes referred to it will be understood that various adjuvants may be added to the spun liquid without departing from the scope of the invention. It is in particular advantageous to add plastifying and flexing agents. The bodies which may serve for this purpose, either alone or mixed, are: aromatic sulphamides and their derivatives, organic phosphates, such as, triphenyl, tricresyl or tributyl phosphate, phthalates, such as, butyl phthalate and so forth.

The following examples will serve to set out more clearly the conditions of preparing artificial threads forming the subject of the invention without limiting this in any way.

*Example I*

There are mixed together

| | | |
|---|---|---|
| Polymerized vinyl acetate | 5 | kgs. |
| Water | 5 | kgs. |
| Denatured alcohol | 0.500 | kg. |
| Commercial hydrochloric acid, 22° to 23° Baumé | 5 | liters |

The mixing is carried out until there is complete dissolution, then it is allowed to stand over night. On the following day there is added:

Trioxymethylene _____ 1.800 kg.

The mixture is then allowed to stand in the cold for ten hours.

The thick filtered solution is spun at 40–45° C. in an aqueous solution of sodium carbonate containing one gramme per litre by the continuous process.

*Example II*

There are mixed together in the cold:

| | | |
|---|---|---|
| Polymerized vinyl acetate | 5 kgs. |
| Water | 3 kgs. |
| Denatured alcohol | 1 kg. |
| Commercial hydrochloric acid, 22° to 23° Baumé | 5 litres |

After thorough mixing the mixture is allowed to stand for six hours and there are then added thereto Paracetaldehyde _____ 2.500 kgs.

The resultant mixture is allowed to stand for ten hours in the cold then it is precipitated by water, thoroughly washed and dried.

The condensation product is dissolved in a mixture of:—

| | | |
|---|---|---|
| Methyl acetate | 5 | kgs. |
| Denatured alcohol | 5 | kgs. |
| Butyl phthalate | 0.600 | kg. |

The filtered and centrifuged collodion is entirely suitable for dry spinning processes.

*Example III*

There are mixed together in the cold

| | | |
|---|---|---|
| Vinyl acetate | 5 | kgs. |
| Water | 2 | kgs. |
| Denatured alcohol | 0.500 | kg. |
| Commercial hydrochloric acid | 5 | litres. |

The mixture is allowed to stand for one hour, after homogenization there are added:

Formaldehyde in aqueous solution at 40%__ 4.5 kg.

This is allowed to stand over night. On the following day precipitation is effected by means of water, the resultant product is washed, dried and there are dissolved in the mixture:—

| | | |
|---|---|---|
| Chloroform | 5 | kgs |
| Ethylene trichloride | 3 | kgs. |
| Tricresyl phosphate | 0.500 | kg. |

The filtered and centrifuged collodion is suitable for the dry spinning process.

What I claim is:

1. Process for the preparation of artificial fibers consisting in mixing a polyvinyl ester in the cold with an aliphatic aldehyde of the group comprising acetaldehyde and formaldehyde and their polymers in the presence of an organic solvent so as to obtain a condensation product, and spinning the acid condensation product in a coagulating bath, consisting of a dilute aqueous solution of sodium carbonate, said bath being heated.

2. Process for the production of artificial fibres consisting in mixing together in the cold polymerized vinyl acetate, water, denatured alcohol, and commercial hydrochloric acid, allowing said mixture to stand, adding trioxymethylene to said mixture, allowing the resultant mixture to stand, filtering said solution, and spinning the filtrate in an aqueous solution of sodium carbonate.

3. Process for the production of artificial fibers consisting in mixing together in the cold polymerized vinyl acetate, water, denatured alcohol, and commercial hydrochloric acid, allowing said mixture to stand, adding paracetaldehyde to the mixture, allowing the resultant mixture to stand, filtering said solution, and spinning the filtrate in a dilute aqueous solution of sodium carbonate.

4. Process for the production of artificial fibers consisting in mixing together in the cold polymerized vinyl acetate, water, denatured alcohol, and commercial hydrochloric acid, allowing said mixture to stand, adding a 40% aqueous solution of formaldehyde to said mixture, allowing the resultant mixture to stand, filtering said solution, and spinning the filtrate in a dilute aqueous solution of sodium carbonate.

5. As a new article of manufacture an artificial thread consisting of a condensation product of polyvinyl alcohol and trioxymethylene.

6. As a new article of manufacture an artificial thread consisting of a condensation product of polyvinyl alcohol and formaldehyde.

7. As a new article of manufacture an artificial thread consisting of a condensation product of polyvinyl alcohol and paracetaldehyde.

8. A process for the preparation of artificial textile fibers consisting in causing polymerized vinyl acetate to react at ordinary temperature in a solvent reactive medium composed of a concentrated solution of hydrochloric acid and a small quantity of alcohol to form a polyvinyl alcohol, adding to said polyvinyl alcohol product trioxymethylene to form a condensation product, and spinning said condensation product in a warmed bath consisting of a dilute aqueous solution of sodium carbonate.

9. A process for the preparation of artificial textile fibers consisting in causing polymerized vinyl acetate to react at ordinary temperature in a solvent reactive medium composed of a concentrated solution of hydrochloric acid and a small quantity of alcohol to form a polyvinyl alcohol, adding to said polyvinyl alcohol product formaldehyde to form a condensation product, and spinning said condensation product in a warmed bath consisting of a dilute aqueous solution of sodium carbonate.

10. A process for the preparation of artificial textile fibers consisting in causing polymerized vinyl acetate to react at ordinary temperature in a solvent reactive medium composed of a concentrated solution of hydrochloric acid and a small quantity of alcohol to form a polyvinyl alcohol, adding to said polyvinyl alcohol product paracetaldehyde to form a condensation product, and spinning said condensation product in a warmed bath consisting of a dilute aqueous solution of sodium carbonate.

11. A process for the preparation of artificial textile fibers consisting in causing polymerized vinyl acetate to react at ordinary temperature in a solvent reactive medium composed of a concentrated solution of hydrochloric acid and a small quantity of alcohol to form a polyvinyl alcohol, adding to said polyvinyl alcohol product an aliphatic aldehyde containing less than three carbon atoms to form a condensation product, and spinning said condensation product in a warmed bath consisting of a dilute aqueous solution of sodium carbonate.

12. A process for the preparation of artificial textile fibers consisting in causing polymerized vinyl acetate to react at ordinary temperature in a solvent reactive medium composed of a concentrated solution of hydrochloric acid and a small quantity of alcohol to form a polyvinyl alcohol, adding to said polyvinyl alcohol product polymers of an aliphatic aldehyde containing less than three carbon atoms to form a condensation product, and spinning said condensation product in a warmed bath consisting of a dilute aqueous solution of sodium carbonate.

13. As a new article of manufacture an artificial textile fiber consisting of a condensation product of polyvinyl alcohol and an aliphatic aldehyde containing less than three carbon atoms.

14. As a new article of manufacture an artificial textile fiber consisting of a condensation product of polyvinyl alcohol and polymers of an aliphatic aldehyde containing less than three carbon atoms.

15. As a new article of manufacture an artificial textile fiber consisting of a condensation product of polyvinyl alcohol and an aliphatic aldehyde containing less than three carbon atoms, and plastifying and flexing agents.

16. As a new article of manufacture an artificial textile fiber consisting of a condensation product of polyvinyl alcohol and polymers of an aliphatic aldehyde containing less than three carbon atoms, and plastifying and flexing agents.

17. As a new article of manufacture an artificial textile fiber consisting of a condensation product of polyvinyl alcohol and an aliphatic aldehyde of the group consisting of acetaldehyde and formaldehyde and their polymers.

MAURICE BELLOC.